US009313552B1

(12) United States Patent
Park et al.

(10) Patent No.: US 9,313,552 B1
(45) Date of Patent: Apr. 12, 2016

(54) METHOD AND APPARATUS FOR RELAYING TERRESTRIAL BROADCAST SIGNAL

(71) Applicants: Ecopro ICT, Inc., Sungnam-si, Gyeonggi-do (KR); EPICT, Inc., Austin, TX (US)

(72) Inventors: Sang Il Park, Round Rock, TX (US); Ju Nyen Kim, Seoul (KR)

(73) Assignee: ECOPRO ICT, INC., Sungnam-Si, Gyeonggi-Do (KR)

(*) Notice: Subject to any disclaimer, the term of this patent is extended or adjusted under 35 U.S.C. 154(b) by 0 days.

(21) Appl. No.: 14/701,036

(22) Filed: Apr. 30, 2015

(51) Int. Cl.

| | |
|---|---|
| ***H04N 7/18*** | (2006.01) |
| ***H04N 21/647*** | (2011.01) |
| ***H04N 21/6334*** | (2011.01) |
| ***H04N 21/61*** | (2011.01) |
| ***H04N 21/41*** | (2011.01) |

(52) U.S. Cl.
CPC ..... *H04N 21/64707* (2013.01); *H04N 21/4122* (2013.01); *H04N 21/6112* (2013.01); *H04N 21/6118* (2013.01); *H04N 21/6334* (2013.01)

(58) Field of Classification Search
USPC ........ 725/81
See application file for complete search history.

(56) References Cited

U.S. PATENT DOCUMENTS

| | | | | |
|---|---|---|---|---|
| 8,321,564 | B2 * | 11/2012 | Palm | H04L 12/2832 348/734 |
| 8,631,450 | B1 * | 1/2014 | Bernath | H04L 12/2801 725/119 |
| 2006/0117371 | A1 * | 6/2006 | Margulis | H04L 12/2838 725/131 |
| 2012/0117595 | A1 * | 5/2012 | Svendsen | H04N 5/76 725/39 |
| 2013/0042281 | A1 * | 2/2013 | Buff et al. | 725/81 |
| 2013/0227620 | A1 * | 8/2013 | Chen | H04N 21/4122 725/81 |
| 2015/0150060 | A1 * | 5/2015 | Wu | H04N 21/6131 725/62 |
| 2015/0156541 | A1 * | 6/2015 | Seo | 725/81 |

FOREIGN PATENT DOCUMENTS

| | | | |
|---|---|---|---|
| JP | 200533572 | A | 2/2005 |
| JP | 5866046 | B | 1/2016 |
| WO | 2011136581 | A2 | 11/2011 |
| WO | 2014069509 | A1 | 5/2014 |

OTHER PUBLICATIONS

Japanese Notice of Allowance for application 2015-094093 dated Nov. 30, 2015.

* cited by examiner

*Primary Examiner* — Nicholas Corbo
(74) *Attorney, Agent, or Firm* — Hauptman Ham, LLP

(57) ABSTRACT

An apparatus for relaying a terrestrial broadcast signal includes a broadcast receiving unit configured to receive a broadcast signal from a terrestrial broadcast station via a over-the-air broadcast network and a broadcast streaming unit configured to stream the broadcast signal to a display terminal via a wireless communication network.

20 Claims, 7 Drawing Sheets

METHOD AND APPARATUS FOR RELAYING TERRESTRIAL BROADCAST SIGNAL

BACKGROUND

1. Field

The present disclosure relates to a method and an apparatus for relaying a terrestrial broadcast signal, and more particularly, to a method and an apparatus for receiving a terrestrial broadcast signal from a terrestrial broadcast station and streaming the broadcast signal to a display terminal in a wireless manner.

2. Description of the Related Art

In general, a terrestrial broadcast receiver including an antenna, which is installed in a room and receives a broadcast signal transmitted from a terrestrial broadcast station via an over-the-air broadcast network, is connected to a display terminal such as a television in a wired manner with a cable. For this reason, when a place for installing the display terminal is determined in the room, an area for installing the terrestrial broadcast receiver including the antenna is limited within an area where the cable reaches due to the limited length of the cable, or vice versa.

With the above-mentioned terrestrial broadcast receiver connected to the display terminal via a cable, even when an optimal location exists, which provides a better broadcast signal reception, if the optimal over-the-air signal reception location is in a place where the terrestrial broadcast receiver and the display terminal cannot be connected to each other due to the limited length of the cable, the terrestrial broadcast receiver ends up with being installed in an area where the cable reaches, which may be far from the optimal over-the-air signal reception location, unless the installation place of the display terminal is changed. This causes the relative broadcast reception sensitivity to be decreased, and hence there may be a case where a high-quality terrestrial broadcast cannot be provided to a user.

FIG. 1 is a schematic diagram for illustrating an example of an installation area of the terrestrial broadcast receiver. As shown in FIG. 1, a terrestrial broadcast receiver 10 is connected to a display terminal 20 such as a television in a wired manner via a cable CB. Therefore, when an installation place of the display terminal 20 is determined, a place where the terrestrial broadcast receiver 10 can be installed is limited within an installable region IR due to the limited length of the cable CB. When an optimal location for receiving the broadcast signal is outside the installable region IR, the terrestrial broadcast receiver 10 cannot be installed at the optimal location unless the installation place of the display terminal 20 is changed, resulting in a situation that the terrestrial broadcast receiver 10 is installed at a location where the over-the-air signal reception sensitivity is relatively low.

Further, the terrestrial broadcast receiver 10 is generally connected in one-on-one to the display terminal 20, and hence the broadcast signal received by the terrestrial broadcast receiver 10 is provided to only a single unit of the display terminal 20. To cope with this problem, a method of transmitting the broadcast signal to a plurality of personal display terminals 20 by using a signal distribution jack or the like may be employed. In this case, however, an additional device such as a signal distributor needs to be installed, which necessitates an additional work process.

International Publication No. WO-2011136581 describes a system for providing a service of various contents including real-time broadcast, contents on demand (COD), game, news, and the like by using an Internet network connected to a room, instead of the terrestrial broadcast receiver that receives real-time contents from a terrestrial broadcast station.

However, in the technology described in International Publication No. WO-2011136581, the contents are received from a server, and hence it is not suitable for a system for displaying a terrestrial broadcast signal that is transmitted in real time from a terrestrial broadcast station on a display terminal.

SUMMARY

An apparatus for relaying a terrestrial broadcast signal according to some embodiments of the present disclosure includes a broadcast receiving unit configured to receive a broadcast signal from a terrestrial broadcast station via a over-the-air broadcast network and a broadcast streaming unit configured to stream the broadcast signal to a display terminal via a wireless communication network.

A method of relaying a broadcast signal according to some embodiments of the present disclosure includes receiving a broadcast signal from a terrestrial broadcast station via a over-the-air broadcast network and streaming the broadcast signal to a display terminal via a wireless communication network.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
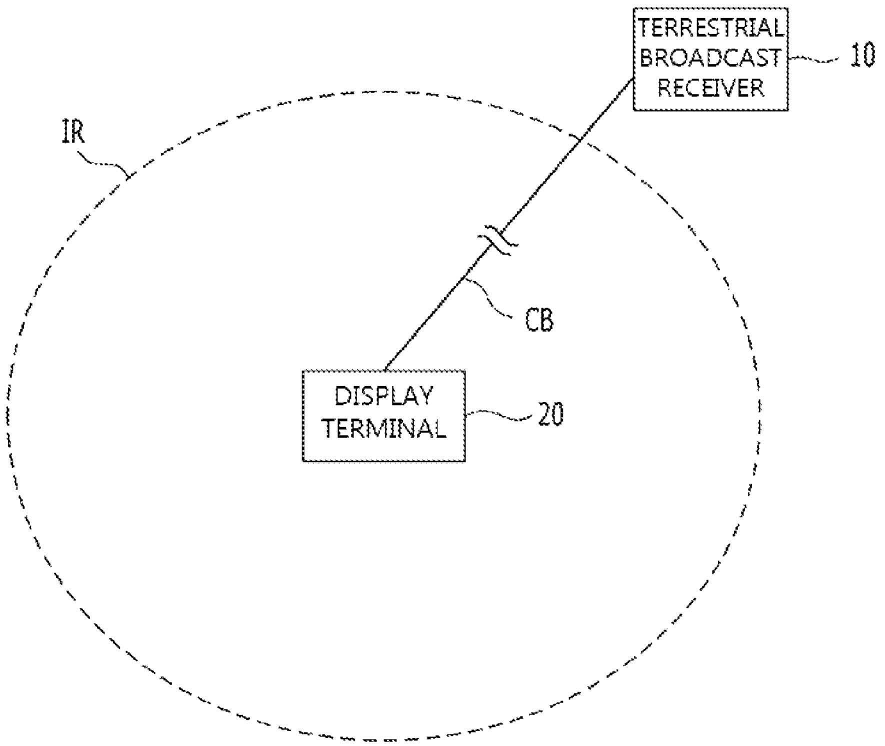
FIG. 1 is a schematic diagram for illustrating an example of an installation area of a terrestrial broadcast receiver.

Exemplary embodiments of the present disclosure are described in detail below with reference to the accompanying drawings. In the following descriptions, like reference numerals designate like elements although the elements are shown in different drawings. Further, detailed descriptions of known functions and configurations incorporated herein are omitted for the purpose of clarity and for brevity.

A terrestrial broadcast signal relay apparatus according to some embodiments of the present disclosure is described with reference to FIG. 2.

Figure 2:
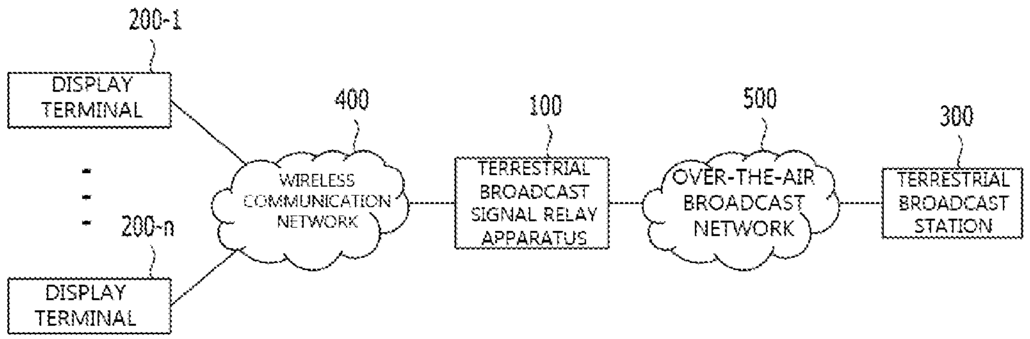
FIG. 2 is a schematic diagram for illustrating an operation of a terrestrial broadcast signal relay apparatus according to some embodiments of the present disclosure.

FIG. 2 is a schematic diagram for illustrating an operation of a terrestrial broadcast signal relay apparatus 100 according to some embodiments of the present disclosure.

As shown in FIG. 2, the terrestrial broadcast signal relay apparatus 100 is connected to a plurality of personal display terminals (200-1 to 200-*n*) (also collectively referred to as "display terminal 200") via a wireless communication network 400.

The broadcast signal relay apparatus 100 relays a broadcast signal from a terrestrial broadcast station 300 to the display terminal 200. That is, the broadcast signal relay apparatus 100 receives the broadcast signal from the terrestrial broadcast station 300, and streams the terrestrial received broadcast signal to the display terminal 200 via the wireless communication network 400. In some embodiments, the broadcast signal relay apparatus 100 streams the broadcast signal to a plurality of display terminals 200-1 to 200-*n*.

The display terminal 200 receives the terrestrial broadcast signal from the broadcast signal relay apparatus 100 via the wireless communication network 400, and displays (outputs on a screen) the received broadcast signal. The display terminal 200 includes a terminal equipped with a microprocessor including a memory unit and having a computational capability such as a television, a desktop computer, a laptop computer, a workstation, a palmtop computer, an ultra mobile personal computer (UMPC), a tablet, a personal digital assistant (PDA), a weblet, a smartphone, or a mobile phone.

The terrestrial broadcast station 300 broadcasts live terrestrial TV in real time. That is, the terrestrial broadcast station 300 converts a terrestrial live TV program such as drama, news, film, or the like into a wireless broadcast signal, and transmits the wireless broadcast signal via a over-the-air broadcast network 500. The terrestrial broadcast station 300 may use a broadcast satellite (not shown) to transmit the broadcast signal.

The wireless communication network 400 refers to a communication network for transmitting and receiving various data. The wireless communication network 400 includes a WiFi network. In some embodiments, the wireless communication network 400 includes a near field wireless communication network such as near field communication (NFC) and Bluetooth™.

The over-the-air broadcast network 500 is a broadcast network for transferring the broadcast signal transmitted from the terrestrial broadcast station 300.

In this manner, the broadcast signal relay apparatus 100 streams the broadcast signal received from the terrestrial broadcast station 300 in an over-the-air manner to the display terminal 200 in a wireless manner without using a cable, and hence the broadcast signal relay apparatus 100 can be installed at the optimal location that provides a better terrestrial broadcast reception sensitivity. Therefore, a terrestrial broadcast reception condition can be improved.

Further, by streaming the broadcast signal to a plurality of personal display terminals 200-1 to 200-*n*, the efficiency of the broadcast signal relay apparatus 100 can be increased.

Figure 3:
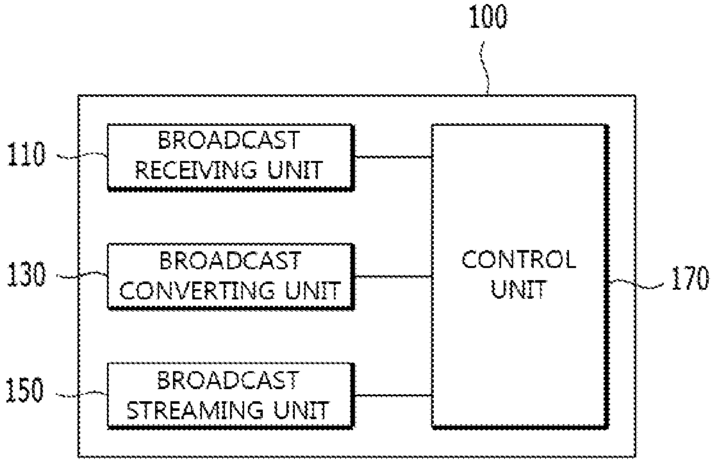
FIG. 3 is a block diagram of the terrestrial broadcast signal relay apparatus shown in FIG. 2.

Referring to FIG. 3, the broadcast signal relay apparatus 100 according to some embodiments of the present disclosure is described in detail.

FIG. 3 is a block diagram of the broadcast signal relay apparatus 100 shown in FIG. 2

As shown in FIG. 3, the broadcast signal relay apparatus 100 includes a broadcast receiving unit 110, a broadcast converting unit 130, a broadcast streaming unit 150, and a control unit 170.

The broadcast receiving unit 110 receives the broadcast signal from the terrestrial broadcast station 300 via the over-the-air broadcast network 500.

The broadcast converting unit 130 converts a format of the terrestrial broadcast signal received by the broadcast receiving unit 110 into a format that is transmittable to the display terminal 200 via the wireless communication network 400. That is, the broadcast converting unit 130 converts a broadcast signal of a format that is usable in the terrestrial broadcast network 500 into a broadcast signal of a format that is usable in the wireless communication network 400. For example, when the wireless communication network 400 is a WiFi network, the broadcast converting unit 130 converts the terrestrial broadcast signal received by the broadcast receiving unit 110 into a format that is transmittable via the WiFi network.

The broadcast streaming unit 150 streams the broadcast signal received by the broadcast receiving unit 110 and converted by the broadcast converting unit 130 to the display terminal 200 via the wireless communication network 400. The display terminal 200 receives the broadcast signal and displays the received broadcast signal on a screen.

In some embodiments, the broadcast streaming unit 150 streams the broadcast signal received by the broadcast receiving unit 110 and converted by the broadcast converting unit 130 to the plurality of personal display terminals 200-1 to 200-*n* via the wireless communication network 400.

In some embodiments, when streaming the broadcast signal with the format converted, the broadcast streaming unit 150 transmits format information of the broadcast signal before being converted to the display terminal 200. For example, the broadcast streaming unit 150 transmits the format information, and then streams the broadcast signal indicated by the format information. Upon receiving the format information while performing other process, the display terminal 200 suspends the other process, and performs a screen display of the broadcast signal, which has a relatively large process load, based on a format indicated by the format information.

In some embodiments, the broadcast streaming unit 150 adjusts a streaming speed depending on a reception condition of the broadcast signal. In some embodiments, the broadcast streaming unit 150 adjusts the streaming speed or image quality depending on the number of display terminals that perform the screen output of the broadcast signal. For example, the broadcast streaming unit 150 decreases the streaming speed or the image quality when the number of display terminals is large.

The control unit 170 controls overall operation of the broadcast signal relay apparatus 100. That is, the control unit 170 controls operations of the broadcast receiving unit 110, the broadcast converting unit 130, and the broadcast streaming unit 150, such that the broadcast signal transmitted from the terrestrial broadcast station 300 is transferred to the display terminal 200.

In some embodiments, the control unit 170 performs an authentication of the display terminal 200, and when the authentication of the display terminal 200 is approved, streams the broadcast signal to the display terminal 200 with the authentication approved.

That is, the control unit 170 receives authentication request information from the display terminal 200 via the wireless communication network 400. The authentication request information includes information for identifying the display terminal 200.

The control unit 170 authenticates the display terminal 200 based on the received authentication request information. For example, if the display terminal 200 that transmitted the authentication request information is a terminal that registered in advance, the control unit 170 approves the authentication of the display terminal 200. On the other hand, if the display terminal 200 is a terminal that is not registered, the control unit 170 denies the authentication of the display terminal 200.

When the corresponding display terminal 200 is approved, the control unit 170 transmits authentication approval information to the corresponding display terminal 200 via the wireless communication network 400.

Thereafter, the control unit 170 streams the broadcast signal that is received by the broadcast receiving unit 110 and converted by the broadcast converting unit 130 to the display terminal 200 with the authentication approved via the broadcast streaming unit 150 in a wireless manner.

In some embodiments, the control unit 170 streams broadcast signal of a channel that is requested by the display terminal 200 with the authentication approved to the corresponding display terminal 200 in a wireless manner.

That is, the control unit 170 receives channel reception request information from the display terminal 200 with the authentication approved via the wireless communication network 400. The channel reception request information includes information for identifying the display terminal 200, information for identifying a desired broadcast channel.

Thereafter, the control unit 170 controls the broadcast receiving unit 110 to receive broadcast signal based on information for identifying a broadcast channel that is requested by the display terminal 200. The control unit 170 then streams the received broadcast signal to the display terminal 200 via the broadcast streaming unit 150 in a wireless manner.

Figure 4:
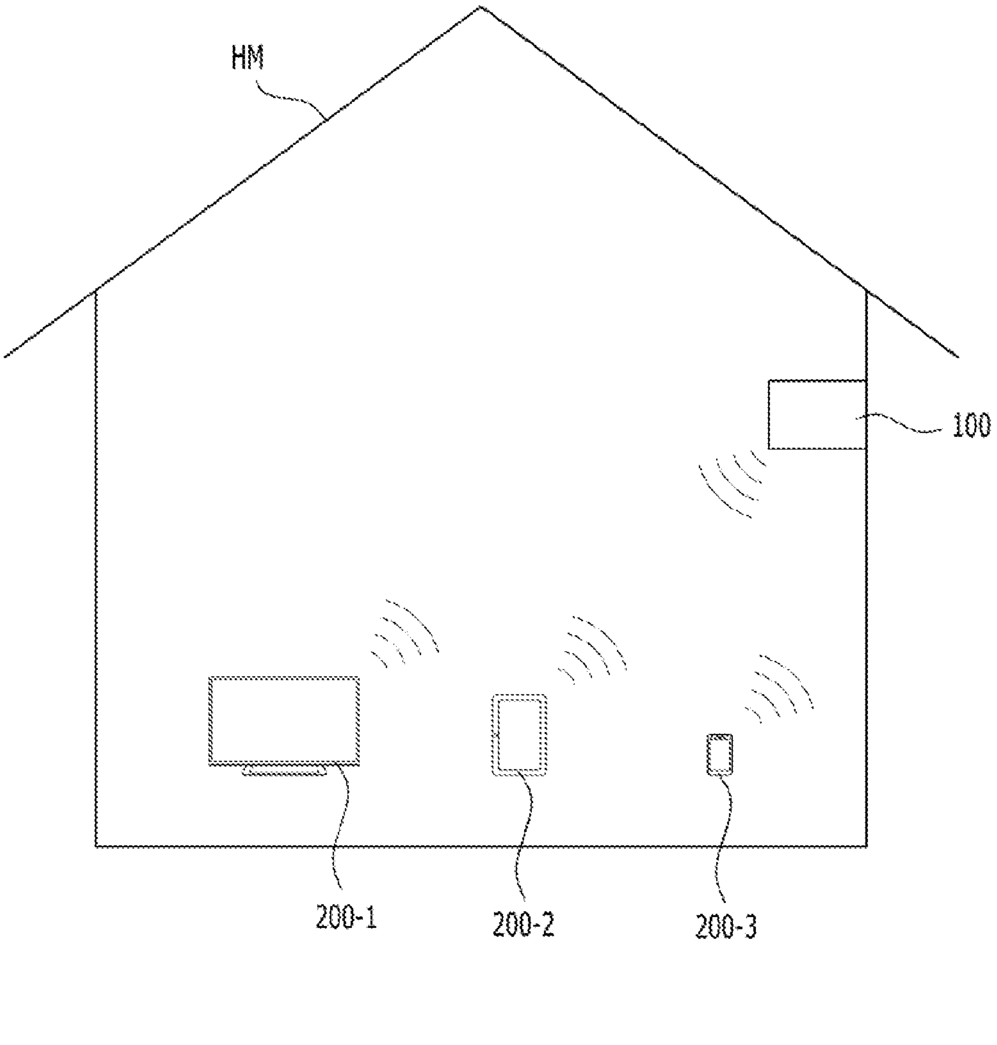
FIG. 4 is a schematic diagram for illustrating an example of a terrestrial broadcast signal relay operation of the broadcast signal relay apparatus according to some embodiments of the present disclosure.

Referring to FIG. 4, an example of the broadcast signal relay operation of the broadcast signal relay apparatus 100 is described in detail.

FIG. 4 is a schematic diagram for illustrating an example of the broadcast signal relay operation of the broadcast signal relay apparatus 100 according to some embodiments of the present disclosure. As shown in FIG. 4, the broadcast signal relay apparatus 100 is installed at the optimal location that provides a better broadcast reception sensitivity in a home HM, and a television 200-1, a tablet 200-2, and a smartphone 200-3 are located in the home HM.

The broadcast signal relay apparatus 100 is connected to the television 200-1, the tablet 200-2, and the smartphone 200-3 via the wireless communication network 400 without using a cable. Therefore, the broadcast signal relay apparatus 100 is capable of providing the received broadcast signal to the display terminal 200 without a distance constraint therebetween.

Figure 5:
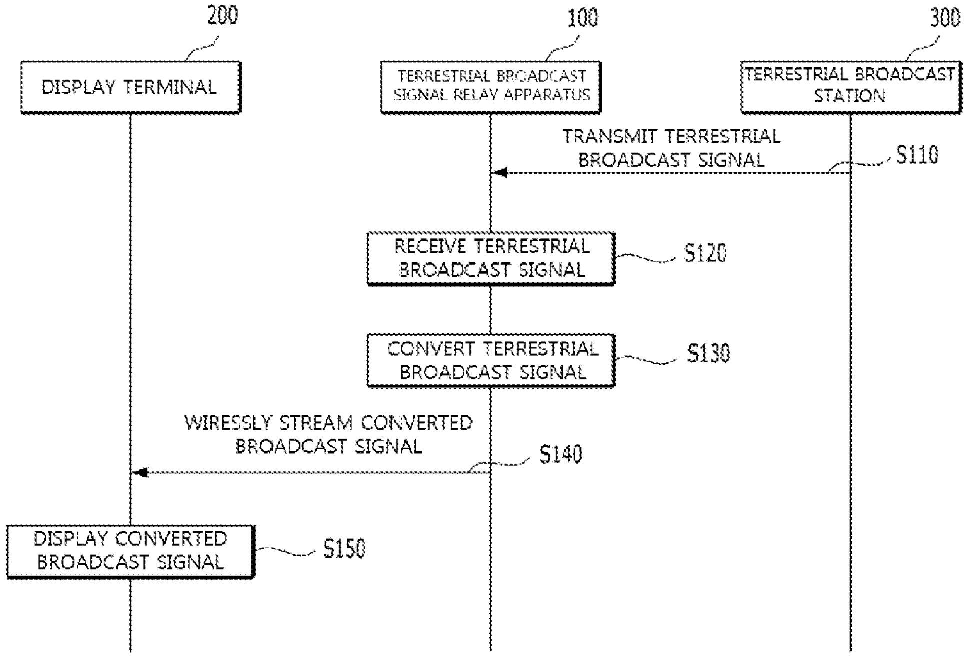
FIG. 5 is a schematic diagram for illustrating an example of a broadcast signal relay method according to some embodiments of the present disclosure.
Figure 6:
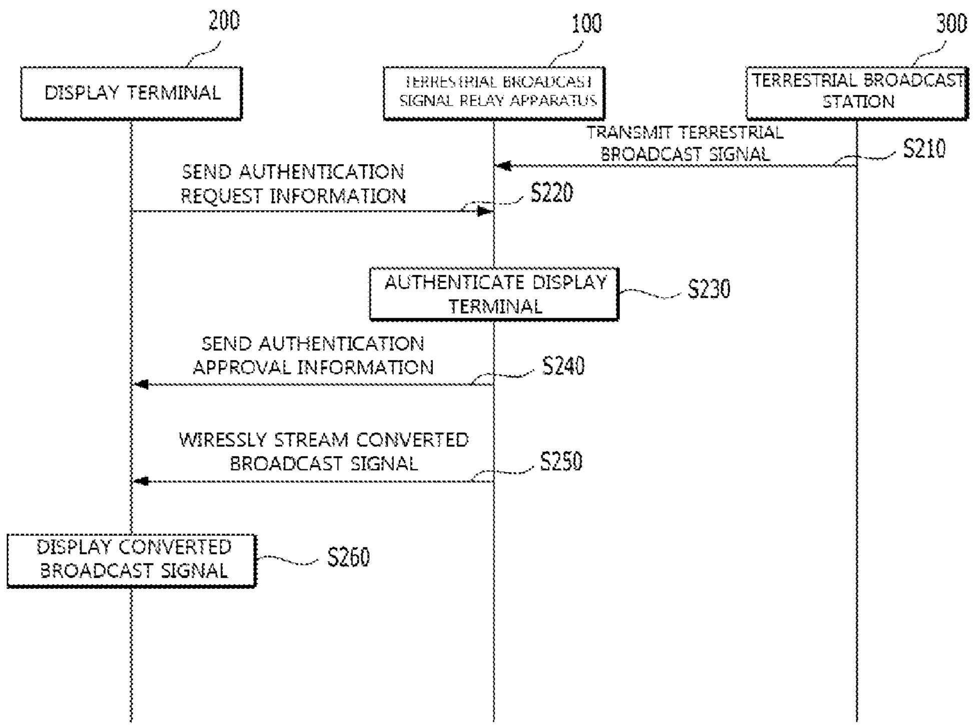
FIG. 6 is a schematic diagram for illustrating another example of the broadcast signal relay method according to some embodiments of the present disclosure.
Figure 7:
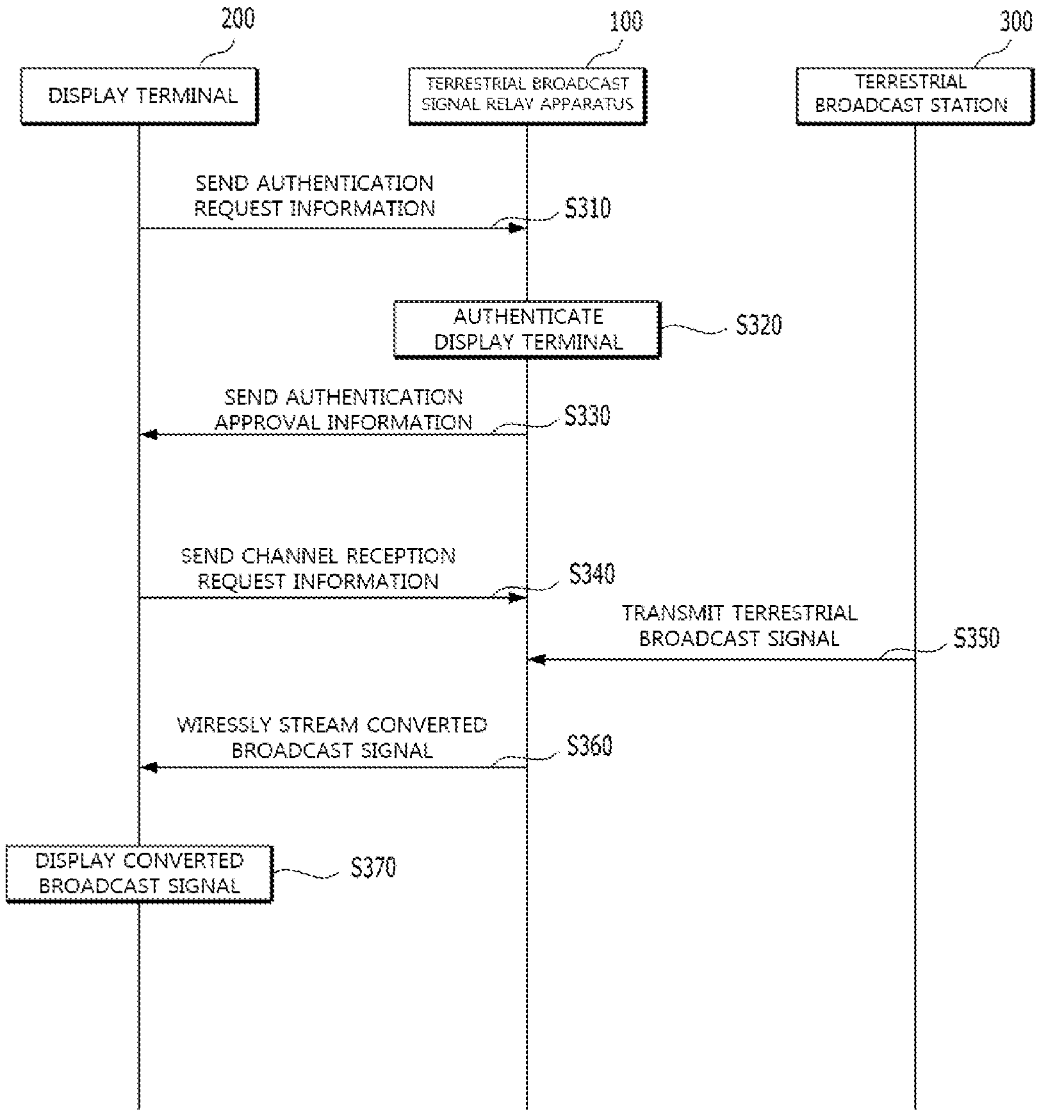
FIG. 7 is a schematic diagram for illustrating still another example of the broadcast signal relay method according to some embodiments of the present disclosure.

Referring to FIGS. 5 to 7, a broadcast signal relay method according to some embodiments of the present disclosure is described.

FIG. 5 is a schematic diagram for illustrating an example of the broadcast signal relay method according to some embodiments of the present disclosure.

At Step S110, the terrestrial broadcast station 300 transmits a broadcast signal via the over-the-air broadcast network 500.

At Step S120, the broadcast signal relay apparatus 100 receives the broadcast signal transmitted from the terrestrial broadcast station 300 via the over-the-air broadcast network 500. At Step S130, the broadcast signal relay apparatus 100 converts the received broadcast signal into a broadcast signal of a format that is transmittable to the display terminal 200 via the wireless communication network 400.

That is, the broadcast signal relay apparatus 100 converts a broadcast signal of a format that is transmittable via the over-the-air broadcast network 500 into a broadcast signal of a format that is transmittable via the wireless communication network 400. For example, when the wireless communication network 400 is a WiFi network, the broadcast signal relay apparatus 100 converts the received broadcast signal into a broadcast signal of a format that is transmittable via the WiFi network.

Thereafter, at Step S140, the broadcast signal relay apparatus 100 streams the broadcast signal to the display terminal 200 via the wireless communication network 400 in a wireless manner. In some embodiments, the broadcast signal relay apparatus 100 streams the broadcast signal to each of the plurality of personal display terminals 200-1 to 200-*n* via the wireless communication network 400 in a wireless manner.

At Step S150, the display terminal 200 displays (screen outputs) the received broadcast signal.

In this manner, the broadcast signal relay apparatus 100 streams the broadcast signal received from the terrestrial broadcast station 300 in an over-the-air manner to the display terminal 200 via the wireless communication network 400 in a wireless manner without using a cable. Therefore, the broadcast signal relay apparatus 100 can be installed at the optimal location that provides a better broadcast reception sensitivity.

Further, by streaming the broadcast signal to each of the plurality of personal display terminals 200-1 to 200-*n*, the efficiency of the broadcast signal relay apparatus 100 can be increased.

FIG. 6 is a schematic diagram for illustrating another example of the broadcast signal relay method according to some embodiments of the present disclosure.

At Step S210, the terrestrial broadcast station 300 transmits a broadcast signal via the over-the-air broadcast network 500.

Thereafter, at Step S220, the display terminal 200 transmits authentication request information to the broadcast signal relay apparatus 100 via the wireless communication network 400. At Step S230, the broadcast signal relay apparatus 100 receives the authentication request information, and authenticates the display terminal 200 based on the authentication request information.

When the authentication of the corresponding display terminal 200 is approved, at Step S240, the broadcast signal relay apparatus 100 transmits authentication approval information to the display terminal 200 via the wireless communication network 400.

Thereafter, at Step S250, the broadcast signal relay apparatus 100 streams the broadcast signal to the display terminal 200 with the authentication approved via the wireless communication network 400. At Step S260, the display terminal 200 displays the received broadcast signal (screen output). The steps of receiving the broadcast signal and converting the format of the broadcast signal in the broadcast signal relay apparatus 100 are omitted in FIG. 6, as these steps are similar to those shown in FIG. 5.

In some embodiments, when the authentication of the display terminal 200 is denied, the broadcast signal relay apparatus 100 streams the broadcast signal to a display terminal other than the display terminal 200 with the authentication denied (for example, a display terminal that is located near the display terminal for which the authentication is denied and that transmitted no authentication request information to the broadcast signal relay apparatus 100).

In this case, in some embodiments, the broadcast signal relay apparatus 100 streams the broadcast signal to the display terminal other than the display terminal 200 in a format that differs from the format of the broadcast signal intended to be transmitted to the display terminal 200 with the authentication denied. In some embodiments, the broadcast signal relay apparatus 100 streams a broadcast signal having image quality lower than the broadcast signal intended to be transmitted to the display terminal 200 with the authentication denied. In some embodiments, when the authentication is denied, the broadcast signal relay apparatus 100 selects other display terminal associated when the authentication is denied, and streams the broadcast signal to the selected display terminal.

FIG. 7 is a schematic diagram for illustrating still another example of the broadcast signal relay method according to some embodiments of the present disclosure.

At Step S310, the display terminal 200 transmits authentication request information to the broadcast signal relay apparatus 100 via the wireless communication network 400. At Step S320, the broadcast signal relay apparatus 100 authenticates the display terminal 200 based on the received authentication request information.

When the authentication of the display terminal 200 is approved, at Step S330, the broadcast signal relay apparatus 100 transmits authentication approval information to the display terminal 200 via the wireless communication network 400.

Thereafter, at Step S340, the display terminal 200 with the authentication approved transmits channel reception request information to the broadcast signal relay apparatus 100 via the wireless communication network 400.

At Step S350, the terrestrial broadcast station 300 transmits the broadcast signal via the over-the-air broadcast network 500. The broadcast signal relay apparatus 100 receives the broadcast signal based on the channel reception request information via the over-the-air broadcast network 500. Thereafter, at Step S360, the broadcast signal relay apparatus 100 streams the broadcast signal to the display terminal 200 via the wireless communication network 400 in a wireless manner. Upon receiving the broadcast signal, at Step S370, the display terminal 200 displays the received broadcast signal on a screen. The steps of receiving the broadcast signal and converting the format of the broadcast signal at the broadcast signal relay apparatus 100 are omitted in FIG. 7, as these steps are similar to those shown in FIG. 5.

Some embodiments of the present disclosure can be implemented as a code, which is readable by a computer, on computer-readable recording medium. The computer-readable recording medium includes all types of recording devices that can store data. An example of the computer-readable recording medium includes one implemented in a form of carrier wave (transmitted through the Internet) as well as ROM, RAM, CD-ROM, magnetic tape, flexible disk, optical data storage device, and the like. The computer-readable recording medium can be distributed to computer devices connected to a wired or wireless communication network, and stored and executed as a code that is readable by a computer in a distributed manner.

It is an object of the present invention to provide a method and an apparatus which can improve a broadcast reception condition for receiving a broadcast signal from a terrestrial broadcast station.

The technical problems to be solved by the present disclosure are not limited to the above-mentioned, but other technical problems not mentioned above can be clearly understood by one of ordinary skill in the pertinent art from the following descriptions.

As described above, according to some embodiments of the present disclosure, a broadcast signal received from a terrestrial broadcast station via a over-the-air broadcast network is streamed to a display terminal in a wireless manner without using a cable, and hence a broadcast signal relay apparatus can be installed in a place that provides a better broadcast reception sensitivity. Therefore, a broadcast reception condition can be improved.

Further, according to some embodiments of the present disclosure, the broadcast signal is streamed to a plurality of display terminals, and hence the efficiency of the broadcast signal relay apparatus can be increased.

The present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

What is claimed is:

1. An apparatus for relaying a terrestrial broadcast signal, the apparatus comprising:

a terrestrial broadcast receiving unit configured to receive a terrestrial broadcast signal from a terrestrial broadcast station via an over-the-air terrestrial broadcast network;

a terrestrial broadcast streaming unit configured to stream the terrestrial broadcast signal to a first display terminal via a wireless communication network; and a control unit configured to receive authentication request information from the first display terminal via the wireless communication network, when an authentication of the first display terminal is approved based on the authentication request information, to send authentication approval information to the first display terminal via the wireless communication network, and to cause the terrestrial broadcast streaming unit to stream the terrestrial broadcast signal to the first display terminal with the authentication approved via the wireless communication network, wherein when the authentication of the first display terminal is denied, the control unit is configured to cause the terrestrial broadcast streaming unit to stream the terrestrial broadcast signal to a second display terminal that differs from the first display terminal.

2. The apparatus according to claim 1, further comprising a terrestrial broadcast converting unit configured to convert a format of the terrestrial broadcast signal received by the terrestrial broadcast receiving unit into a format that is transmittable via the wireless communication network, wherein the terrestrial broadcast streaming unit is configured to stream the terrestrial broadcast signal of which the format is converted by the terrestrial broadcast converting unit to the display terminal via the wireless communication network.

3. The apparatus according to claim 2, wherein the wireless communication network includes a WiFi network.

4. The apparatus according to claim 1, the control unit is configured to receive terrestrial channel reception request information from the display terminal with the authentication approved via the wireless communication network, to cause the terrestrial broadcast receiving unit to receive the terrestrial broadcast signal based on the channel reception request information, and to cause the terrestrial broadcast streaming unit to stream the terrestrial broadcast signal received based on the channel reception request information to the display terminal via the wireless communication network.

5. The apparatus according to claim 1, wherein the display terminal includes a plurality of personal display terminals, and the terrestrial broadcast streaming unit is configured to stream the terrestrial broadcast signal to each of the plurality of personal display terminals via the wireless communication network.

6. The apparatus according to claim 1, wherein the authentication request information comprises information for identifying the first display terminal.

7. The apparatus according to claim 1, wherein the second display terminal is a display terminal that is located near the first display terminal and that transmitted no authentication request information.

8. The apparatus according to claim 1, wherein the control unit is configured to cause the terrestrial broadcast streaming unit to stream the terrestrial broadcast signal to the second display terminal in a format that differs from the format of the terrestrial broadcast signal intended to be transmitted to the first display terminal.

9. The apparatus according to claim 8, wherein the control unit is configured to cause the terrestrial broadcast streaming unit to stream the terrestrial broadcast signal to the second display terminal with an image quality lower than that of the terrestrial broadcast signal intended to be transmitted to the first display terminal.

10. The apparatus according to claim 1, wherein when the authentication of the first display terminal is denied, the control unit is configured to select a display terminal among display terminals other than the first display terminal as the second display terminal.

11. A method of relaying a terrestrial broadcast signal, the method comprising:

receiving a terrestrial broadcast signal from a terrestrial broadcast station via an over-the-air terrestrial broadcast network;

streaming the terrestrial broadcast signal to a first display terminal via a wireless communication network;

receiving authentication request information from the first display terminal via the wireless communication network; and sending, when the authentication of the first display terminal is approved, authentication approval information to the first display terminal via the wireless communication network, wherein the streaming comprises streaming the terrestrial broadcast signal to the first display terminal with the authentication approved via the wireless communication network, and when the authentication of the first display terminal is denied, the streaming comprises streaming the terrestrial broadcast signal to a second display terminal that differs from the first display terminal.

12. The method according to claim 11, further comprising converting a format of the terrestrial broadcast signal received at the receiving into a format that is transmittable via the wireless communication network, wherein the streaming comprises streaming the terrestrial broadcast signal of which the format is converted by the terrestrial broadcast converting unit to the display terminal via the wireless communication network.

13. The method according to claim 12, wherein the wireless communication network includes a WiFi network.

14. The method according to claim 11, further comprising:

receiving channel reception request information from the display terminal with the authentication approved via the wireless communication network; and receiving the terrestrial broadcast signal based on the channel reception request information, wherein the streaming comprises streaming the terrestrial broadcast signal received based on the channel reception request information to the display terminal via the wireless communication network.

15. The method according to claim 11, wherein the display terminal comprises a plurality of personal display terminals, and the streaming comprises streaming the terrestrial broadcast signal to each of the plurality of personal display terminals via the wireless communication network.

16. The method according to claim 11, wherein the authentication request information comprises information for identifying the first display terminal.

17. The method according to claim 11, wherein the second display terminal is a display terminal that is located near the first display terminal and that transmitted no authentication request information.

18. The method according to claim 11, wherein the streaming comprises streaming the terrestrial broadcast signal to the second display terminal in a format that differs from the format of the terrestrial broadcast signal intended to be transmitted to the first display terminal.

19. The method according to claim 18, wherein the streaming comprises streaming the terrestrial broadcast signal to the second display terminal with an image quality lower than that of the terrestrial broadcast signal intended to be transmitted to the first display terminal.

20. The method according to claim 11, further comprising selecting, when the authentication of the first display terminal is denied, a display terminal among display terminals other than the first display terminal as the second display terminal.

* * * * *